UNITED STATES PATENT OFFICE.

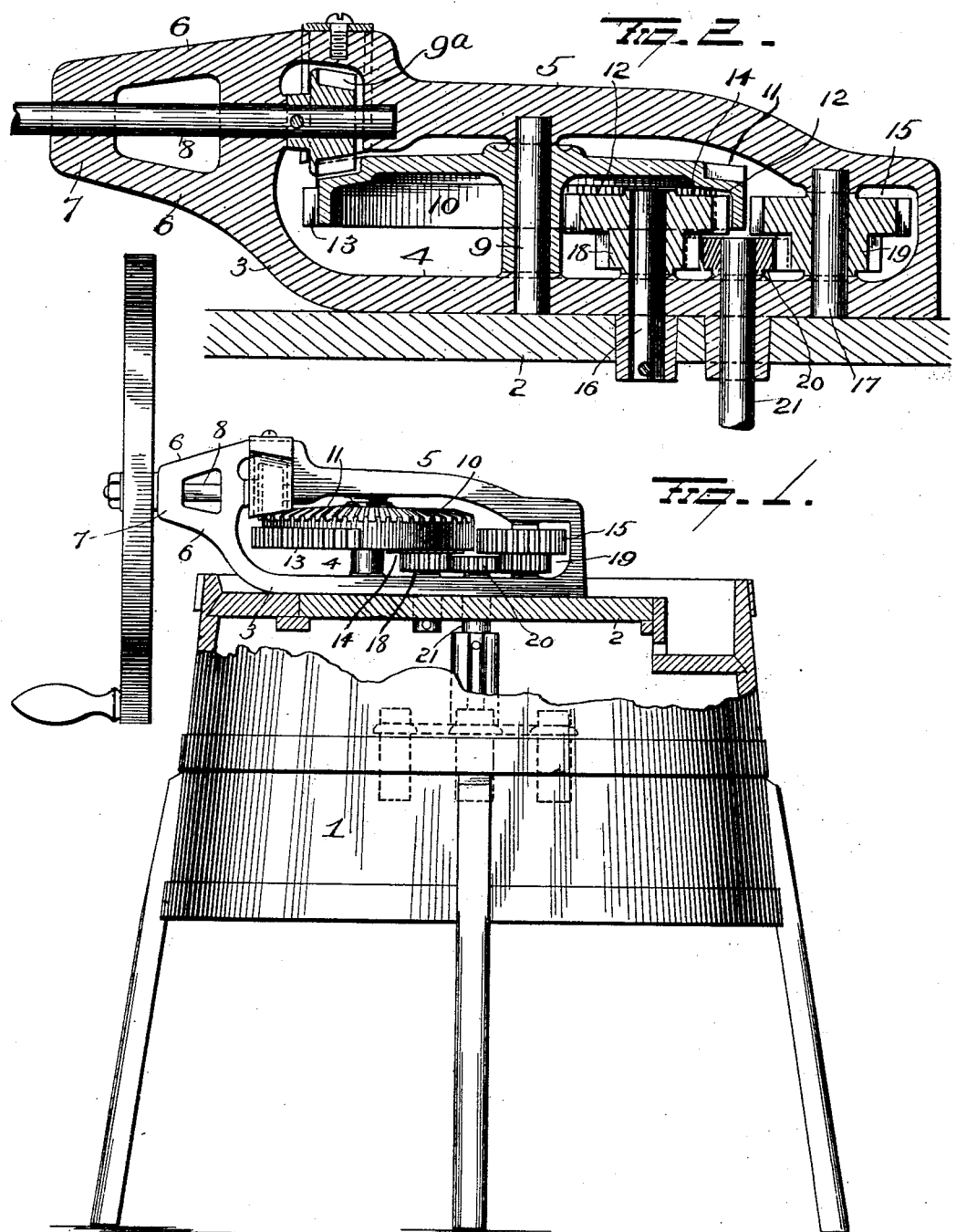

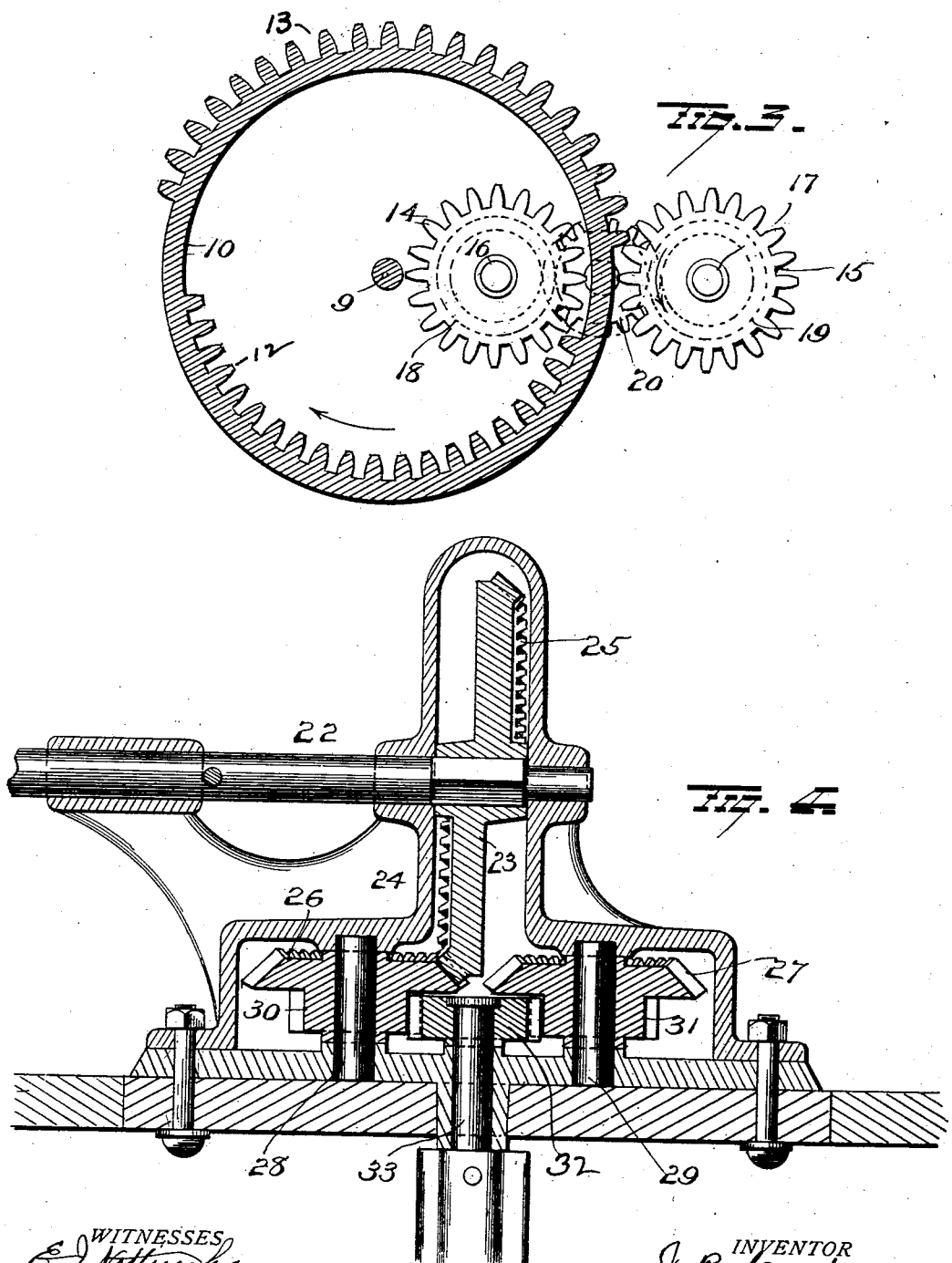

JOHN R. CARTER, OF AUGUSTA, KENTUCKY, ASSIGNOR TO ERNST H. HUENEFELD, OF CINCINNATI, OHIO.

GEARING.

SPECIFICATION forming part of Letters Patent No. 713,396, dated November 11, 1902.

Application filed June 6, 1902. Serial No. 110,494. (No model.)

*To all whom it may concern:*

Be it known that I, JOHN R. CARTER, of Augusta, in the county of Bracken and State of Kentucky, have invented certain new and useful Improvements in Gearing; and I do hereby declare the following to be a full, clear, and exact description of the invention, such as will enable others skilled in the art to which it appertains to make and use the same.

My invention relates to an improvement in gearing, and more particularly to gearing for washing-machines, churns, and the like, the object of the invention being to provide improvements of this character in which a wheel is continuously revolved in either direction and adapted through the medium of intermeshing gears to intermittingly revolve a driven shaft in opposite directions.

With this object in view the invention consists in certain novel features of construction and combinations and arrangements of parts, as will be more fully hereinafter described, and pointed out in the claims.

In the accompanying drawings, Figure 1 is a view in elevation. Fig. 2 is a view in section. Fig. 3 is a horizontal plan view, partly in section; and Fig. 4 is a view of a modified form of my invention.

1 represents a tub or other receptacle having the cover 2, on which a metal frame 3 is secured, and comprises the base 4, made with an integral bowed bracket 5 and provided at one end with converging arms 6, supporting a bearing 7, alining with a bearing in bracket 5 to support the drive-shaft 8, turned by a hand-wheel or other suitable mechanism. Frame 3 is provided with a vertical shaft 9, on which an inverted-cup-shaped wheel 10 is mounted to turn. This wheel 10 is disposed horizontally and has provided on its upper face at its outer edge a circular rack 11, with which a gear $9^a$ on drive-shaft 8 meshes to continuously revolve said wheel 10 in either direction, according to the direction of movement of the drive-shaft. On the depending lower portion of wheel 10 an internal segmental gear 12 is provided, and an external segmental gear 13 is provided around the outer face of the wheel. These segments 12 and 13 are located on the wheel 10 at diametrically opposite points and are adapted to engage idle gear-wheels 14 and 15, respectively, located on suitable shafts or pins 16 17, secured in the frame and supporting the gears 14 and 15 on opposite sides of the depending edge of the wheel 10 and in position to be engaged by the segments thereon. These shafts or pins 16 and 17 also carry gears 18 and 19, which continuously mesh with a gear 20, secured on driven shaft 21, which carries the dasher or agitator of the machine.

In operation the wheel 10 is continuously driven in either direction by the gear $9^a$, and, we will say, internal segment 12 first engages gear 15 to revolve the same and gear 19. The latter meshing with gear 20 turns driven shaft 21 in one direction until internal gear 12 leaves gear 15 and external gear 13 engages gear 14, which turns the same and gear 18, which latter, meshing with gear 20, revolves the latter and shaft 21 in the reverse direction. It will thus be seen that as the segments 12 and 13 move into and out of engagement with gears 14 and 15 the driven shaft will be alternately turned in opposite directions.

While I have described shaft 21 as the driven shaft, it will be seen that either shaft 16 or 17 might constitute the driven shaft and gear 20 serve as an idler, the result being precisely as above explained—namely, to alternately revolve the driven shaft in opposite directions.

In Fig. 4 I have shown a modified form of my invention, in which drive-shaft 22 is provided with a vertically-disposed wheel 23, made on its opposite faces at its edge with segments 24 and 25, respectively, said segments being located at points on the wheel diametrically opposite to each other. These segments engage idle gear-wheels 26 and 27 on shafts 28 and 29, carried by the frame 3, and on these shafts 28 and 29 other gears 30 and 31, respectively, are secured and mesh with a gear 32, located between them and secured to the driven shaft 33. The operation of this form of my invention is as follows: Segment 25 first engages gear 27 to revolve the same and gear 31, which latter, meshing with gear 32, revolves the same and driven shaft 33 in one direction. As segment 25 leaves gear 27 segment 24 immediately engages gear 26 to drive the same and gear 30, which latter meshes with gear 32 to drive the shaft 33 in the opposite direction. In this form of my invention any of the shafts 28, 29, or 33 may constitute the driven shaft and carry the dasher of the machine. I would also have it understood that though I have referred to the various gears separately the gears on the same shafts are made in the form of double integral gears.

A great many other changes might be made in the general form and arrangement of the several parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. The combination of a wheel to be continuously revolved in either direction, said wheel provided with two gear-segments, a driven gear, idle gears alternately engaged by the segments and gears revolved by the idle gears to revolve the driven gear in opposite directions.

2. The combination of an inverted-cup-shaped wheel, a circular rack thereon, a gear meshing with the rack to drive the wheel continuously in either direction, said wheel provided with an internal and an external gear-segment on its depending portion, idle gears alternately engaged by said segments, other gears turned by said idle gears, a driven shaft and a gear thereon to be intermittingly driven in opposite directions by said last-mentioned gears.

In testimony whereof I have signed this specification in the presence of two subscribing witnesses.

JOHN R. CARTER.

Witnesses:
S. W. FOSTER,
A. W. BRIGHT.